Sept. 2, 1924.
E. PERRIN
1,507,513
HELICOPTER WITH VARIABLE PITCH PROPELLER
Filed March 16, 1921   3 Sheets-Sheet 1
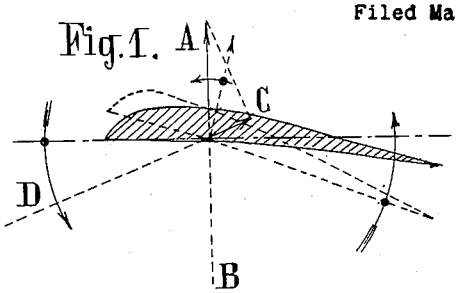
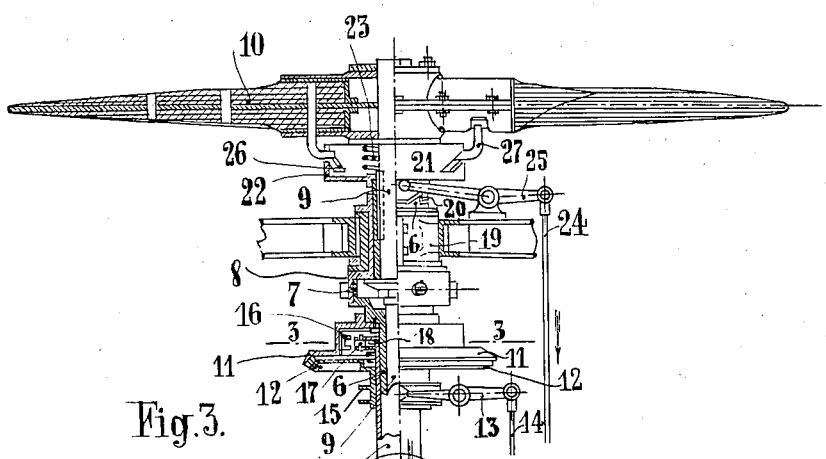
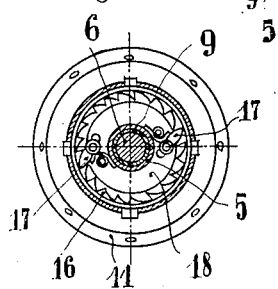
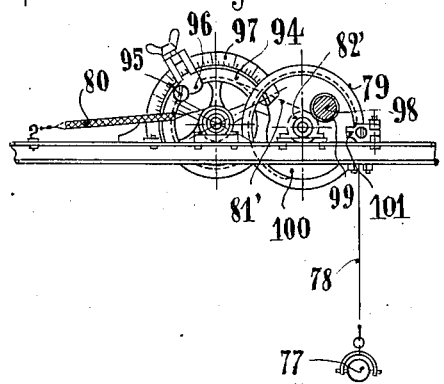
INVENTOR
Edouard Perrin.
BY
Emil Bonnelycke
ATTORNEY

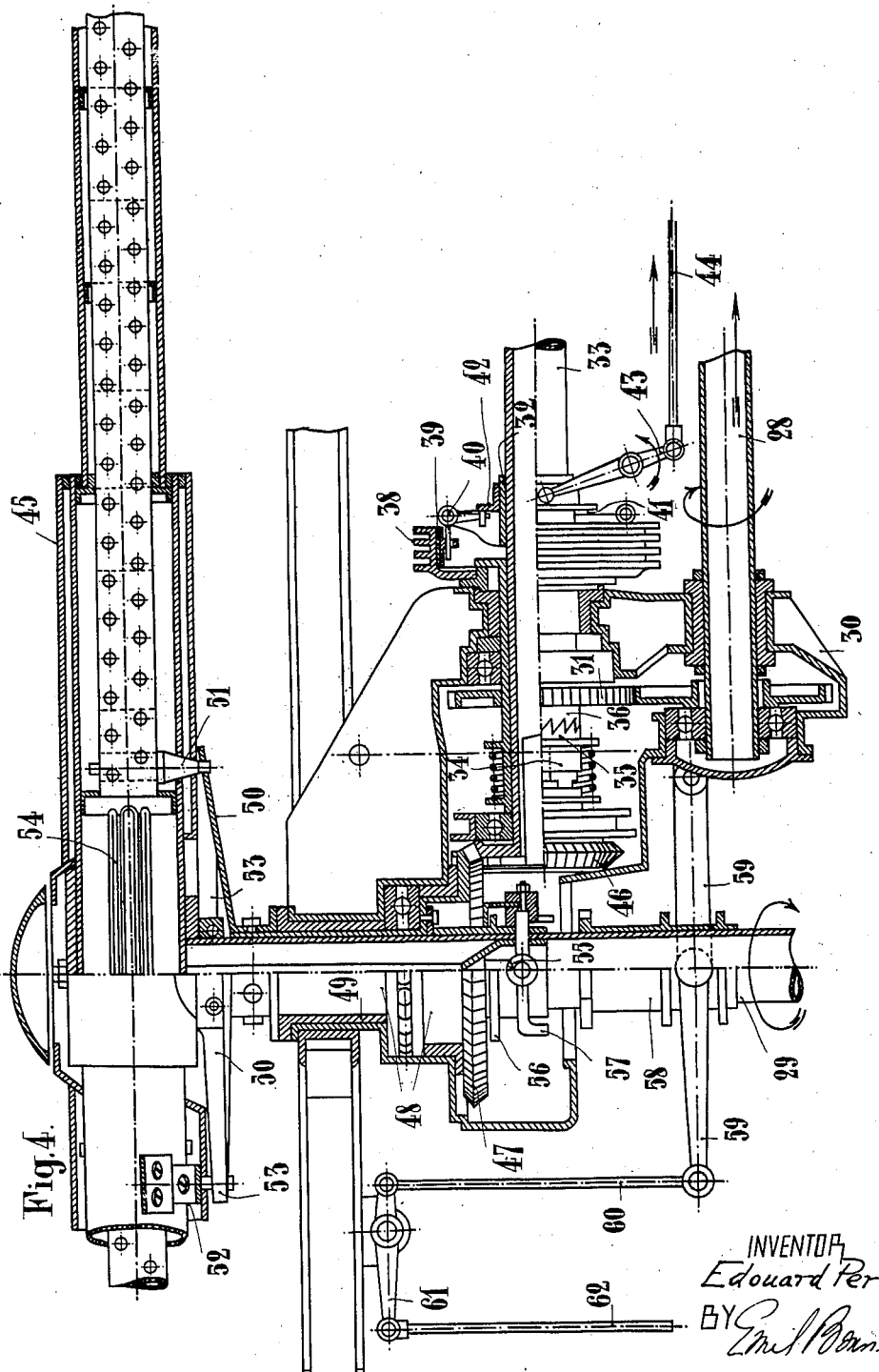

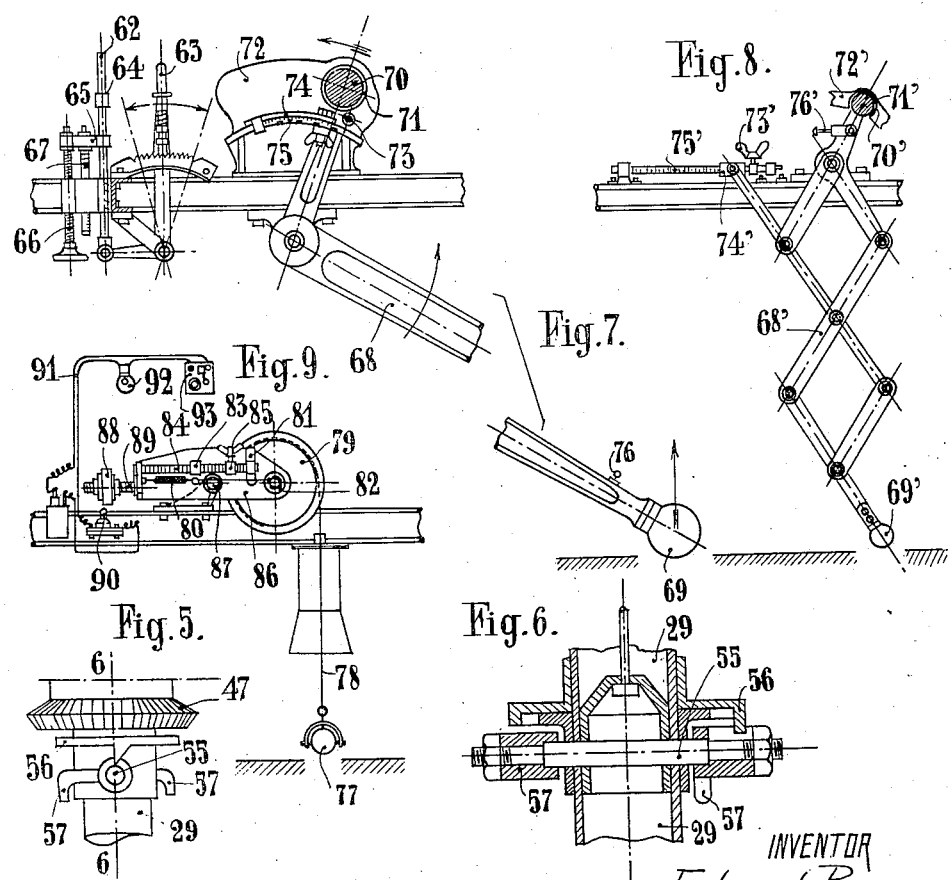

Patented Sept. 2, 1924.

1,507,513

UNITED STATES PATENT OFFICE.

EDOUARD PERRIN, OF PARIS, FRANCE.

HELICOPTER WITH VARIABLE-PITCH PROPELLER.

Application filed March 16, 1921. Serial No. 452,708.

*To all whom it may concern:*

Be it known that I, EDOUARD PERRIN, citizen of the Republic of France, and resident of Paris, France, post-office address 61 Avenue Victor Emmanuel III, have invented a new and useful Helicopter with Variable Pitch Propeller, which improvements are fully set forth in the following specification.

This invention relates to air craft of the helicopter type; and it proposes, briefly, an improved machine which, in the event of the engine or engines stopping or failing in any way and from any cause, may descend at a reduced speed, with or without lateral displacement, and may land with a residual vertical speed reduced to the necessary degree and without appreciable shock.

The invention is characterized by the following features:

First. In order to produce a gradual descent with the engine shut off, supporting or bearing propellers are provided, the pitch of which may be reduced during flight in a certain definite proportion. In the new position of the blades, without the rotation of the propellers being reversed, and with the action of the driving torque suppressed, the propeller maintains its supporting action under the impulse of the ascending air current, which moves with a definite speed relative to the propeller. If the pitch has been adjusted to the proper reduced value, the speed of the propeller may be maintained at that which it had before the engine or engines ceased to function; or the speed may be increased or reduced in any desired proportion.

Second. To obtain, in the event of the driving effort of the engine or engines being insufficient, the automatic and correct rotation of the supporting propellers without any action of the driving torque, means are provided which may be applied to all, or to a part only, of the supporting propellers, and which are preferably as follows:

(*a*) Means tending to return the propellers to the reduced pitch position corresponding to normal descent, with the engine shut off. This return action can be effected, for example, by a spring system which is tensioned by the engine while driving the propellers.

(*b*) A clutch located at a predetermined point on the shaft on which the propeller is secured, and so constructed as to enable a relative rotary movement of small amplitude between said shaft and the shaft of the engine.

The aforesaid spring system is inserted betwen the two main members of the clutch and acts at one end on the driving member and at the other end on the propeller through the intermediary of the gear which controls the pitch variations. It is tensioned by the engine, when the latter is running, as previous stated, and it first operates the pitch control gear to bring the pitch to its maximum value; after which it only transmits the action of the torque to the propellers. In case the engine slows down or fails, the torque becomes weaker and the spring system automatically restores the pitch to its minimum value, which corresponds to that of normal descent with the engine shut off.

Third. For the purpose of obtaining before landing a reduction of vertical speed of descent, with the engine shut off, means are provided to enable the pilot to control the pitch of the propeller, so that when the ship reaches a predetermined distance from the ground, the pitch may be instantaneously increased. The incidence of the blades on the surounding air is thus increased, and the propellers therefore brake the speed of descent.

Fourth. Means are provided for facilitating the rotation of the propellers during normal descent with the engine shut off, such means preferably comprising:

(*a*) A ratchet clutch interposed between the engine shaft and the propeller shaft for connecting the two together to enable the rotation of the engine to be transmitted to the propeller shaft to drive the same but preventing the transmission of rotary movement from the propeller to the engine shaft, so that during normal descent of the ship, with the engine shut off, the propeller may rotate freely at a speed which is greater than that of the engine, or without having to overcome its passive resistance.

(*b*) A friction clutch, which is located adjacent the ratchet clutch and which may be utilized to instantaneously couple the engine shaft with the propeller shaft, thus eliminating the action of the ratchet clutch. This clutch renders it possible to drive the propeller from the engine while the latter is running at slow speed and, during the normal descent of the ship, to set the clutch progressively in order to re-start the engine owing to the momentum stored in the propeller mechanism.

Fifth. In connection with the mechanism for adjusting the pitch of the propeller, there is provided a landing indicator which is constructed to automatically actuate a signal when the ship reaches a predetermined distance from the ground, thereby notifying the pilot to set the blades at the proper pitch for landing. The indicator preferably comprises an element terminating in a contact head and settable to adjust said head at the desired distance from the fuselage, the engagement of the contact head with the ground serving to bring about the actuation of the signal. The contact head may, of course, take any suitable form and may be constructed to enable it to function effectively and without injury in case the machine is designed to land on water or on rough or uneven ground.

In the accompanying drawing:

Figure 1 is a diagrammatic view representing a section of one of the blades of the supporting propeller and the relative positions of the forces acting thereon during normal descent of the ship with the engine shut off.

Fig. 2 is a view, half in side elevation and half in vertical section, of the propeller.

Fig. 3 is a horizontal section on line 3—3, Fig. 2.

Fig. 4 shows a modification of the construction illustrated in Fig. 2.

Fig. 5 is an enlarged detail view of the device for enabling the pilot to increase the minimum pitch value of the propeller, as illustrated in Fig. 4.

Fig. 6 is a vertical section on line 6—6, Fig. 5.

Fig. 7 is a view in side elevation showing the landing indicator and its position relative to the pitch-control device.

Fig. 8 is a side elevation of a modified form of indicator.

Fig. 9 shows a further modified indicator, and a modified signal.

Fig. 10 is a development of the construction shown in Fig. 9.

In the diagram shown in Fig. 1, the position of the blade before the engine is shut off is indicated in dotted lines, and the arrows indicate the movement of the blade and of the forces acting on it when the pitch is reduced to keep the blade rotating after the engine has been shut off, the new position of the blade being represented in full lines. In this new position, A indicates the resultant force of the air on the blade; B, the axis of rotation of the propeller; and C, the component of the force A along the direction of the descending trajectory D of the blade, such direction resulting from the rotary movement of the blade combined with the movement of vertical descent of the ship itself.

Under the foregoing conditions, the force A of the air acting on the blade is approximately in the direction of the axis of rotation B of the propeller, and the mechanical work produced by the weight of the whole ship in its vertical descent is balanced by the force C acting almost horizontally along the descending trajectory D. If the pitch reduction has been so adjusted that the speed of rotation of the propeller during descent with the engine shut off is sufficient, the work of the resistance C can be sufficiently great to reduce the speed of descent of the ship to such an extent as precludes the possibility of serious injury either to the pilot or to the ship in the event of an accidental landing. Moreover, during the descent of the ship with the engine shut off, the force A influences the ship in the same manner as when it is supported in normal flight.

Referring to Figs. 2 and 3, 5 indicates the vertical main shaft which is connected to be driven in some suitable manner from the engine (not shown). This shaft is hollow, as illustrated, and has fitted in its upper end the lower portion of a hollow, two-part transmission shaft 6 provided with a central enlargement 7 to receive a shoulder 8, in the form of a nut, screwed on the lower end of the propeller shaft 9, to which latter the propeller 10 is fastened; the nut or shoulder 8 transmitting the bearing thrust of the propeller to the helicopter frame. The rotary movement of the main shaft 5 is transmitted to the intermediate shaft 6 by means of mechanism which may comprise both a friction clutch and a ratchet clutch, the two being independent. The friction clutch embodies friction disks 11 and 12, the former being secured to the lower portion of shaft 6, while the latter is slidably mounted upon the upper portion of shaft 5 and is operated by a forked shifting lever 13 to which a depending pull-rod 14 is pivoted; said lever 13 engaging a grooved, circumferential rib or flange 15 formed on the hub of disk 12. The hub portion of the fixed upper disk 11 is enlarged, as shown, and has secured to its inner wall a ratchet ring 16 forming one member of the ratchet clutch, which ring is engaged by a plurality of spring-pressed pawls 17 pivotally mounted in a grooved or recessed enlargement 18 provided on the extremity of the main shaft 5; the relative arrangement of parts being represented in Fig. 3. The pawl and ratchet clutch is operative under normal conditions when the engine is running and the friction disks 11 and 12 are disengaged, but is rendered inoperative immediately said friction disks are brought together by actuation of the pull-rod 14.

The upper member of the transmission shaft 6 is screwed or bolted on the lower member, and is carried in a bearing 19 in which it is rotatably fitted and which transmits the bearing thrust to the helicopter frame. The aforesaid upper member is formed at its top with a set of ratchet teeth 20 for coaction with a set of similar teeth 21 formed on the lower end of the hub of a sleeve 22 which is keyed to the propeller shaft 9 to rotate therewith and, also, to slide axially thereon; said sleeve being normally forced downward by a spring 23 so as to engage the two sets of teeth 20 and 21.

The blades of the propeller are constructed to admit of their being twisted or warped in order to vary their pitch between the maximum and minimum limits previously mentioned; their precise structural details forming no part of the present invention, however. This pitch adjustment or variation is preferably effected by the sleeve 22 during its sliding movements; the upward movement being effected either automatically under the action of the torque of the engine, due to the interposition of the driving clutch 20—21 between the transmission and propeller shafts, or manually by the pilot at will, by operating a pull-rod 24 connected to a forked lever 25. For the above purpose, the sleeve 22 is provided with a set of oblique slots 26, one for each blade of the propeller, in which engage angular fingers 27 carried by said blades; the arrangement being such that said fingers are turned laterally when the movement of the sleeve takes place, thereby twisting the blades, as will be understood. The upward movement of the sleeve acts to compress the spring 23 and thus place it under tension.

Assuming that the engine is shut off, and the friction disks 11 and 12 unclutched preparatory to the descent of the air ship, the sleeve 22 will be forced downward by spring 23 until the clutch teeth 20 and 21 are engaged, and the coaction between the inclined slots 26 and fingers 27 during this movement of the sleeve will twist the blades of the propeller so that the pitch of the latter is brought to its minimum value; it being understood, of course, that said sleeve is prevented from rotating relatively to shaft 9 during its sliding movements because of its key connection therewith. The propeller is then enabled to continue its rotation (which is caused by the action upon it of the ascending air current set up by the descent of the air ship) without such rotation being transmitted to the main shaft 5, because although the disk 11 and ratchet ring 16 continue to rotate, the teeth of the ratchet will slip idly over the pawls 17. Hence, during normal descent, the propeller may rotate at a speed greater than that of the engine, or without having to overcome its passive resistance.

If the engine now be set working, the shaft 5 will positively drive the transmission shaft 6 through the ratchet clutch 17—16 (or through the friction clutch 12—11, if rod 14 has been operated to engage the clutch disks), and the coaction between the ratchet teeth 20 and 21 will force sleeve 22 upward against the pressure of spring 23. The upward movement of the sleeve causes the bent ends of the fingers 27 to move downwardly in the slots 26 until they hit against the lower ends thereof; the result being that the propeller blades are twisted in the opposite direction and the propeller automatically attains its maximum pitch. The driving torque then acts on the oblique sides of the ratchet teeth 20; and since the sleeve 22 cannot be moved any higher, it will be rotated at the same speed as the transmission shaft 6 and, in turn, necessarily rotates the propeller shaft, to which it is keyed. The sleeve 22 may be moved upward at will by the pilot to any desired extent, by merely pulling rod 24 downward, thereby rocking lever 25 clockwise and raising said sleeve. This adjustment of the sleeve, as will be apparent, has the effect of increasing the minimum pitch value to which the propeller is automatically set when the engine is shut off, the increase in pitch being utilized by the pilot in landing.

In the modified construction illustrated in Fig. 4, the shaft 28 which is driven by the engine is disposed horizontally and, hence, at right angles to the vertical propeller shaft 29. Shaft 28 has fixed to it a gear 30 which meshes with and drives a gear 31 fast on a short horizontal shaft 32 which fits loosely over a countershaft 33; both shafts 28 and 33 being journaled in suitable bearings mounted in the framework and equipped with anti-friction devices. The transmission connections between shafts 28 and 33 comprise both ratchet and friction clutch mechanism, as in the previous construction; the ratchet clutch embodying a sleeve 34 keyed to slide on shaft 33 and provided at one end with a set of ratchet teeth 35 for engagement with similar teeth 36 formed on the adjacent end of the outer elongated tube or shaft 32. The toothed sleeve 34 is pressed toward the toothed end of shaft 32 by a spring 37 in order to engage the two sets of teeth; but the latter are so shaped as to maintain their driving engagement for only one direction of rotation, and to move idly past each other when rotated in the other direction.

The friction clutch connection is operated manually at the will of the pilot, and comprises a drum 38 fixed to shaft 32 and a coacting two-part annular element 39 disposed within the drum and caused to engage the same by means of a pair of bell-crank levers 40 (only one of which appears). These levers are pivoted to a ring 41 secured to shaft 33 and have their horizontal arms engaged with the movable element 39 and their vertical arms engaged with a sliding sleeve 42 mounted on shaft 32 and actuated by a forked lever 43 and pull rod 44. When a pull is exerted on rod 44, sleeve 42 will be caused to slide leftward along shaft 32 and, in consequence, will rock the two bell-crank levers 40 which, in turn, will engage the members of the clutch element 39 and press them outward into frictional engagement with the inner wall of drum 38, thus coupling gear 31 to shaft 33. This closing of the friction clutch has the effect of rendering the ratchet clutch inoperative, just as in the construction first described.

In order to transmit the rotary movement of shaft 33 to the propeller shaft 29, to drive the latter and the propeller 45, there may be provided a pair of intermeshing bevel gears 46 and 47 secured, respectively, to the said shaft 33 and to a sleeve 48 loosely mounted on the propeller shaft and corresponding somewhat to the sliding sleeve 22 in the construction represented in Fig. 2. The upper portion of this sleeve, which is of smaller diameter than the lower portion, to which latter the gear 47 is fixed, extends through a vertical bearing 49 in the framework and terminates in two diametrically-opposite, substantially-horizontal arms 50; each arm being connected at its outer end to a depending finger 51 attached to the adjacent propeller blade, so that the movement of said arms will be transmitted to the blades to warp or turn the same. The movement of each finger is limited by two adjustable screw stops 52 (only one of which appears, however) secured within the hub of the propeller and between which it is disposed; and the fingers are normally pressed against the two invisible stops by spring strips 53 which are secured to the propeller shaft, thereby reducing the pitch of the propeller blades to its minimum value, the action of the springs being assisted by the inherent resiliency of the longitudinal members 54 of the blades, to which the fingers 51 are directly attached. By adjusting the stops 52, it is possible to regulate in a similar way, before flight, the maximum value of the pitch.

The loose mounting of sleeve 48 on the propeller shaft 29, together with the play of the arms 50 and fingers 51 in the spaces between the stops 52 corresponds, in a way, to the action of the ratchet teeth 20 and 21 and, like said teeth, virtually constitutes a one-way driving clutch. The bearing thrust of the propeller is transmitted to the propeller shaft both through the tubular end of said shaft and by means of long bolts screwed into an internal member (not shown) disposed within the shaft and secured to a cross-pin 55. Sleeve 48 is designed to be rotated relatively to the propeller shaft in order to increase the minimum pitch value—a feature of importance in landing—; and to that end, a disk 56, provided with two lugs, is secured to the bottom of sleeve 48, the lugs being engaged by the vertical arms of a pair of bell-crank levers 57 fulcrumed on the cross-pin 55. The vertical arms of the bell-cranks are engageable by a sleeve 58 slidably mounted on shaft 29 and actuated by a shifting fork or lever 59 connected by a link 60 to one end of a second lever 61, the other end of which has a depending pull-rod 62 pivoted to it for operation by the pilot at will. The arrangement is such, therefore, that when a pull is exerted on rod 62, the sleeve 58 will be slid upward along the propeller shaft and will engage the bell-cranks 57 and rock them; and the bell-cranks, in turn, will turn or rotate the disk 56 and the sleeve 48 relatively to the propeller shaft, with the result that the arms 50 are also swung or rotated, and the spring strips or tongues 53 thereby tensioned. The fingers 51 are no longer in contact with the invisible pair of stops 52, and thus the minimum pitch value is increased in proportion to the extent that sleeve 58 is raised.

Assuming, now, that the engine is shut off and the friction clutch 38—39 open, the spring pressure of the tongues 53 and the torsional resilience of the blade members 54 act on the fingers 51 to move them into contact with the invisible pair of stops, provided that the controlling sleeve 58 is in its lowest position. The sleeve 48 is thus turned relative to the propeller shaft, and the blades are warped or turned to their position of minimum pitch. The propeller is then enabled to continue its rotary movement—which is due to the action of the ascending air current caused by the descent of the ship—without driving the engine, the slippage of the ratchet clutch sleeve 34 over the clutch teeth 36 on the gear 31 preventing the latter from rotating.

If the engine is now started, its movement will be transmitted through shaft 28 and the connecting gearing to shaft 33, and from the latter through the intermediate bevel gearing to sleeve 48 which is thereby rotated, its arms 50 acting on fingers 51 to engage them with the visible pair of stops 52. This has the effect of automatically changing the pitch value of the propeller blades to the maximum, while at the same time tensioning the spring tongues 53. The driving torque then acts on the said pair of stops, through the arms 50 engaged therewith, so that the propeller will thus be rotated at the same speed as sleeve 48. The change of the pitch to the maximum may also be effected manually, while the engine is shut off, by raising the controlling sleeve 58 by means of the lever system connected therewith and operated by the pull-rod 62.

Assuming, finally, that the ship is descending normally, with the engine stopped, it is possible to restart the engine merely by pulling on the rod 44 which controls the setting of the friction clutch 38—39. In such case, the rotary movement of the propeller will be transmitted through the bevel gears 47 and 46 to the countershaft 33, and thence through gears 31 and 30 to shaft 28 and to the engine, due to the fact that the closing of the friction clutch acts to couple gear 31 and shaft 33 together.

The pitch-controlling device, which may be the rod 24 of Fig. 2 or the rod 62 of Fig. 4, may be combined with a landing indicator, so that when the airship reaches a predetermined distance from the ground, the pilot is automatically notified to operate the rod and thus effect the desired increase in the pitch. One form which this arrangement may take, is represented in Fig. 7, wherein the control rod 62 (or 24) is operated by a bell-crank lever 63 connected to its lower end; the downward movement of the rod being terminated by the contact of a stop 64 which it carries with a companion stop 65 mounted on a threaded rod 66. The latter is adjustable vertically to vary the position of stop 65, said stop having attached to its a depending scale rod 67 for determining the precise adjustment. The landing indicator is here shown as comprising a bell-crank 68 which is pivotally secured at its apex to the fuselage, its long arm terminating in a ground-engaging head 69, while its short upper arm is provided with a suitable signal 70 which, in the normal position of the parts, is visible through a window 71 formed in a slide 72. This slide carries a stop 73 engageable by the upper arm of the bell-crank 68 to support the latter in operating position, and the slide is also equipped with a pointer or indicator 74 which is fixed to it and which is movable with relation to a scale 75. The two scales 67 and 75 are correspondingly graduated; the same number indicating on one scale a given maximum pitch of the propeller blades, and on the other scale the precise distance from the ground at which this change in pitch must be effected in order to insure correct landing. The bell-crank may be held in raised or inoperative position, when desired, by means of a cable 76 or the like, which is released during flight to permit the bell-crank to drop.

The pilot is notified of the end 69 of the bell crank striking the ground by the disappearance of the signal 70 from behind the window 71. He then operates the lever 63 to change the pitch of the propeller blades to the value required for correct landing, the movement of the lever being checked by the engagement of the stops 64 and 65.

If it is desired to increase the distance available between the ground-engaging end of the indicating device and the fuselage, the construction shown in Fig. 8 may be adopted; and if still greater distances are required, that represented in Fig. 9 may be employed. Referring to Fig. 8, it will be observed that the bell-crank 68 is replaced by a lever 68' having the form of a lazy-tongs, which may be contracted or extended by pulling or releasing the cable 76' connected to the upper end of the tongs; the lower end of the tongs being equipped with the ground-engaging head 69'. The stop is indicated at 73' in Fig. 8, and is adjustable along the scale 75' which here takes the form of a horizontal rod, said stop being engaged by a companion stop 74' which is attached to the lazy-tongs and is slidable along the scale rod. The slide, sight opening and signal are indicated at 72', 71' and 70', respectively, and are generally similar to the corresponding parts shown in Fig. 7.

The construction shown in Fig. 9 is designed for use in cases where a maximum distance between the contact end of the indicator and the fuselage is desired; such construction embodying a weight 77 attached to the end of a cable 78 wound on a drum 79. The latter is controlled by a spring 80 acting on a second cable 81 which is wound on a small pulley 82 fixed to the drum axle. The pull exerted by weight 77 on drum 79 tends to rotate the latter clockwise, as will be understood, thereby rotating pulley 82 and, in consequence, winding up cable 81 and expanding spring 80. The cable 81, at the end where it is connected to spring 80, is also connected to a ring 83 mounted to slide on a horizontal scale rod 84 which is graduated in the same manner as the scale 75' previously mentioned; the sliding movement of ring 83, as caused by the pull exerted upon cable 81, being terminated by the engagement of said ring with an adjustable stop collar 85 mounted on the scale rod, with the result that the further paying-out of cable 81 and distension of spring 80 are prevented. The scale rod 84 and its associated drum 79, spring 80 and cable and pulley connection 81—82 are mounted in a rocking frame 86, which is fulcrumed intermediate its ends at 87; and at the end of this frame opposite to the one where the drum is situated there is provided an adjustable counterweight 88 carried by a threaded shaft or bar 89 fixed to the frame. This weight 88, during its descent, is designed to actuate a push-button switch 90 included in an electric circuit 91 containing a suitable signal or signals; Fig. 9 showing both a lamp or other visible signal 92 and a bell or other audible signal 93. Under normal conditions, the weight 77 and the drum 79 overbalance the counterweight 88, the result being that the drum end of the rocking frame 86 tends to sink and the other end to rise, thus maintaining the counterweight spaced from the push-button 90. But when weight 77 strikes the ground, then its action upon frame 88 is removed, and the latter tends to rock in the opposite direction, being now overbalanced by the counterweight which, in sinking, closes the electric circuit by depressing the push button, whereupon both signals 92 and 93 are actuated. The parts are ultimately brought back to normal position by the return spring 80.

The construction shown in Fig. 9 may be slightly developed or modified, as represented in Fig. 10, in which the pulley 82' on the drum spindle is connected by the cable 81' to an amplifying pulley 94 which has fixed to its hub one end of the return spring 80', the other end being connected to the fuselage. The descent of weight 77 and consequent unwinding of cable 78 from drum 79 entails a clockwise rotation of said drum and of the amplifying pulley 94, such rotation being terminated by the engagement of a stop 95 on the pulley with an adjustable stop arm 96 carried by an arcuate scale 97. The signal device comprises, in this instance, a signal member 98 carried by the drum and normally visible through a window 99 formed in a disk 100 loosely mounted on the drum spindle; said disk being retained in fixed position by a locking device 101 of some sort. At the moment when weight 77 strikes the ground, the spring 80' is enabled to act, rotating the pulley 94 and drum 79 counter-clockwise, the movement of the drum withdrawing the signal 98 from visible position behind the window 99. The pilot is thereby notified that the ship has reached the precise distance from the ground to operate the mechanism for setting the propeller blades at the pitch for proper landing.

In all of the forms above described, it will be seen that the operating element of the indicating mechanism, whether the bell-crank 68, the lazy-tongs 68' or the weight and cable device 77—78, is supported and retained in predetermined adjusted position by the coaction of two stops, one of which is adjustable with relation to the other and to a suitable scale—in the case of the Fig. 7 construction, the adjustable stop is the part 73 carried by the adjustable slide 72, and the companion stop is the adjacent edge of the short upper arm of the bell-crank. When the ground-engaging part on the lower end of the operating element hits the ground, the operating element moves out of its adjusted position and the signal device is instantly actuated, so as to notify the pilot to operate his control, the extent of such operation being determined by the engagement of the stops 64 and 65, the latter of which has previously been set in precise accordance with the setting of the adjustable stop comprised in the indicating mechanism. Hence the pilot is notified exactly when he reaches a predetermined distance from the ground, and is likewise notified the precise extent to which he must operate his controls to make a proper landing from that height.

I claim as my invention:—

1. In an airship, the combination of a supporting propeller having blades the pitch of which is settable in one or the other of two predetermined limits; means acting automatically to adjust the pitch to the minimum limit when the engine is shut off, irrespective of the velocity of the propeller; and means acting automatically to bring the pitch to the maximum limit when the engine torque drives the propeller, irrespective of the propeller velocity.

2. In an airship, the combination of a supporting propeller having blades variable in pitch between two predetermined limits; fingers secured to said blades; springs connected to the propeller shaft and engaging said fingers to automatically adjust the pitch of the blades to the minimum limit when the engine is shut off; and means acting automatically to bring the pitch to the maximum limit when the engine torque drives the propeller.

3. In an airship, the combination of a supporting propeller comprising a set of blades, and resilient longitudinal members carrying said blades and capable of elastic torsion to vary the pitch of the blades between two predetermined limits; means acting automatically to adjust the pitch to the minimum limit when the engine is shut off; and means acting automatically to bring the pitch to the maximum limit when the engine torque drives the propeller.

4. In an airship, the combination of a supporting propeller comprising a set of blades, and resilient longitudinal members carrying said blades and capable of elastic torsion to vary the pitch of the blades between two predetermined limits; fingers secured to said members; springs connected to the propeller shaft and engaging said fingers to automatically adjust the pitch of the blades to the minimum limit when the engine is shut off; and means acting automatically to bring the pitch to the maximum limit when the engine torque drives the propeller.

5. In an airship, the combination of a supporting propeller having blades the pitch of which is settable in one or the other of two predetermined limits; fingers secured to said blades; means acting on said fingers to automatically adjust the pitch to the minimum limit when the engine is shut off, irrespective of the velocity of the propeller; and means acting automatically to bring the pitch to the maximum limit when the engine torque drives the propeller, irrespective of the velocity of the propeller.

6. In an airship, the combination of a supporting propeller having blades the pitch of which is settable in one or the other of two predetermined limits; a propeller shaft; a driving element; means for coupling said driving element and the propeller shaft together to rotate the latter from the former, but enabling a slight relative rotary movement between them; means connected with the propeller shaft for automatically bringing the pitch to the maximum limit when said shaft and driving element are coupled; and means acting automatically on the blades to adjust their pitch to the minimum limit when the engine is shut off.

7. In an airship, the combination of a supporting propeller having blades variable in pitch between two predetermined limits; fingers secured to said blades; and a sleeve loosely rotatable on the propeller shaft and positively driven from the engine, said sleeve acting on said fingers to automatically adjust the pitch to the maximum limit when the engine torque drives the propeller.

8. In an airship, the combination of a propeller having blades settable in pitch in one or the other of two predetermined limits; means acting automatically to adjust the pitch to the minimum limit when the engine is shut off, irrespective of the velocity of the propeller; means acting auomatically to bring the pitch to the maximum limit when the engine torque drives the propeller, irrespective of the propeller velocity; and a controlling device to enable the pilot to adjust at will the minimum value of the pitch during flight.

9. In an airship, the combination of a propeller having blades variable in pitch between two predetermined limits; a shaft to which the propeller is connected; a sleeve loosely mounted on said shaft and driven from the engine; fingers connected to the propeller blades and acted on by said sleeve to increase the pitch of the blades when the engine torque drives the propeller; a sleeve slidably mounted on the propeller shaft; and bell-crank levers pivoted on said shaft and operated by the last-named sleeve to impart to the first-named sleeve a rotary movement relative to the shaft.

In testimony whereof I have signed this specification in the presence of two subscribing witnesses.

EDOUARD PERRIN.

Witnesses:
 CHARLES LÉON LOISEL,
 GEORGES CASCAL CARRIÉRE.